US007998345B2

(12) United States Patent
Jia et al.

(10) Patent No.: US 7,998,345 B2
(45) Date of Patent: Aug. 16, 2011

(54) PLATE FIN FLUID PROCESSING DEVICE

(75) Inventors: Zhijun Jia, La Crosse, WI (US);
Lawrence Andrew Stryker, La Crescent, MN (US); Douglas Eugene Decker, La Crosse, WI (US)

(73) Assignee: Chart Inc., Garfield Heights, OH (US)

( * ) Notice: Subject to any disclaimer, the term of this patent is extended or adjusted under 35 U.S.C. 154(b) by 471 days.

(21) Appl. No.: 12/170,189

(22) Filed: Jul. 9, 2008

(65) Prior Publication Data

US 2009/0014385 A1 Jan. 15, 2009

Related U.S. Application Data

(60) Provisional application No. 60/958,776, filed on Jul. 9, 2007.

(51) Int. Cl.
*B01D 11/00* (2006.01)
*B01J 10/00* (2006.01)
*F28F 3/02* (2006.01)

(52) U.S. Cl. ........ 210/175; 165/166; 210/511; 366/144; 366/150.1; 366/340; 422/601; 422/602; 422/644; 422/646

(58) Field of Classification Search .......... 165/164–167, 165/174, 178; 210/149, 175, 511; 366/144, 366/145, 150.1, 336–341; 422/173, 177, 422/600–602, 644–646, 198; 156/60; 29/890.03, 29/890.038
See application file for complete search history.

(56) References Cited

U.S. PATENT DOCUMENTS

| 3,260,572 | A | | 7/1966 | Faugeras et al. |
| 3,822,999 | A | * | 7/1974 | Pope .............................. 422/228 |
| 4,111,660 | A | | 9/1978 | Kabasawa et al. |
| 5,098,669 | A | * | 3/1992 | Kawanami et al. ........... 422/135 |
| 5,193,611 | A | * | 3/1993 | Hesselgreaves ............... 165/165 |
| 5,690,763 | A | * | 11/1997 | Ashmead et al. ............... 156/60 |
| 5,916,532 | A | | 6/1999 | Ledon |
| 6,510,894 | B1 | * | 1/2003 | Watton et al. .................. 165/166 |
| 2005/0045558 | A1 | | 3/2005 | Northrup, Jr. et al. |
| 2007/0085227 | A1 | | 4/2007 | Tonkovich et al. |

OTHER PUBLICATIONS

International Search Report dated Oct. 10, 2008 (1 page).

* cited by examiner

*Primary Examiner* — Joseph W Drodge
(74) *Attorney, Agent, or Firm* — R. Blake Johnston, Esq.; DLA Piper LLP (US)

(57) ABSTRACT

A device for processing fluids includes a number of fin layers with a number of plates separating the fin layers so that a fluid flow passage is defined through each fin layer. A first fluid inlet is in communication with a first end portion of the fluid flow passage, a first fluid outlet is in communication with a second end portion of the fluid flow passage, a second fluid inlet is in communication with the second end portion of the fluid flow passage and a second fluid outlet in communication with the first end portion of the fluid flow passage. The fluid flowing through the second inlet is subjected to a shearing action by the fin layers so that mass transfer to the fluid flowing through the first inlet occurs. The device may be used for both liquid-liquid processes, such as extraction, or gas-liquid processes, such as adsorption, absorption or desorption and reactions.

51 Claims, 8 Drawing Sheets

PLATE FIN FLUID PROCESSING DEVICE

CLAIM OF PRIORITY

This application claims priority from U.S. Provisional Patent Application Ser. No. 60/958,776, filed Jul. 9, 2007.

FIELD OF THE INVENTION

The invention relates generally to fluid processing equipment and, more particularly, to a device for performing fluid processes that employs plate fin technology.

BACKGROUND

Several important processes in chemical or food production, waste treatment and recovery or purification operations involve the combination of two or more fluids so that separation, mixing and/or a reaction occurs. Such processes include gas-liquid processes, such as adsorption, absorption, desorption and two-phase reactions, and liquid-liquid processes, such as extraction and reactions. While acceptable equipment exists for performing such processes, deficiencies exist which detract from the efficiency of such devices.

The process of liquid-liquid extraction is well-known in the art, as are extractor devices for performing extraction. In liquid-liquid extraction, one or more components are removed from a liquid solution or mixture feed by intimate contact with a second liquid. The second liquid is immiscible with the liquid mixture, but functions as a solvent for removing the component(s) from the mixture as the second liquid exhibits a preferential affinity or selectivity towards one or more of the components in the mixture feed. Liquid-liquid extraction is therefore a mass transfer operation.

A conventional device widely used for performing liquid-liquid extractions is a sieve tray column, also sometimes referred to as a perforated plate column. Examples of such devices are presented in U.S. Pat. No. 3,988,116 to Robbins and U.S. Pat. No. 4,424,131 to Baird.

The liquid-liquid extraction process that occurs in a conventional sieve tray column 10 is illustrated in FIGS. 1-3. FIG. 1 shows the general flow. Positioned at the top end of the column are a Liquid 2 inlet and a Liquid 1 outlet. Positioned at the bottom end of the column are a Liquid 1 inlet and a Liquid 2 outlet. As illustrated in FIG. 2, the sieve tray column, indicated in general at 10, features a number of perforated plates, two of which are illustrated at 12 and 14. In the example illustrated in FIGS. 1-3, a solvent, Liquid 2 in FIG. 1, flows through the inlet at the top of the column, down through the column, and out the outlet at the bottom of the column. A solution, Liquid 1 in FIG. 1, having the component to be removed flows into the column through the inlet at the bottom of the column, up through the column, and out the outlet at the top of the column. In this example, the density of Liquid 2 is greater than the density of Liquid 1, but another case could occur if the solution liquid were denser. Then that liquid would enter at the top and the bubbles would flow downward.

As illustrated in FIG. 2, a liquid bubble 16 of solution is formed as solution (Liquid 1 of FIG. 1) rises through the opening or hole of the lower distributing tray 14. The mass transfer of a component A, which is the target of the extraction, involves several steps. Molecules of the component A move into the solvent (Liquid 2 in FIG. 1) by mass transfer from the surface of the bubble due to the solubility difference in the two liquids. These molecules continue migrating into the solvent (Liquid 2) by diffusion. The decrease in concentration of component A at the surface of the bubble leads to a concentration gradient within the bubble. While the bubble is rising due to buoyancy, as illustrated by arrow 18, the key component A within the bubble of solution (Liquid 1) is diffused from inside of the bubble (as illustrated by arrow 20 in FIG. 3) to interface with solvent (Liquid 2) outside of the bubble through the gradient of concentration of A. The transfer is limited by equilibrium considerations.

When bubbles reach the underside of the upper tray 12, their movement is impeded and they will rejoin to form a new layer of solution (Liquid 1) with a uniform concentration of component A. The layer is called a rejoining layer and is illustrated at 22 in FIG. 2. New small liquid bubbles will be formed again through the perforations of upper distribution tray 12, and the above process repeats.

The mass transfer of component A to the solvent outside of the bubble 16 occurs by diffusion due to the gradient of concentration of component A at a boundary of the bubble. With reference to FIG. 3, the gradient in the boundary area of bubble 16 may be calculated by the equation $(C_{Ab}-C_A)/b$, where:

$C_{Ab}$=concentration of component A at the inner edge of the boundary $C_A$=concentration of component A at the outer edge of the boundary (which is the concentration of component A in the solvent)

b=the thickness of the boundary

If the transfer through the boundary area is faster, then $C_{Ab}$ and $C_A$ can reach equilibrium sooner. The transfer from inside of the bubble to the inner edge of the boundary, that is, the transition from concentration $C_{A0}$ to concentration $C_{Ab}$ (where $C_{A0}$ is the concentration of A at the center of the bubble), is typically the rate control (limiting) step because it is slower than the transfer through the boundary area. The mass transfer from $C_{A0}$ to $C_{Ab}$ highly depends on diffusion which has a high mass transfer resistance. As a result, $C_{Ab}$ increases slowly giving a low mass transfer efficiency due to the lower gradient in the boundary area of the bubbles (per the above equation).

Turning to an example involving a gas-liquid process, absorption or desorption is typically performed using a packed bed tower filled with high surface area or high efficiency packing materials. The efficiency from current packed bed devices, as described above with regard to the liquid-liquid extraction column, is also restricted by the limitation of mass transfer within the bubbles or droplets formed in the tower.

The formation of smaller bubbles or droplets in either the liquid-liquid or gas-liquid devices described above would help to provide more surface area per volume of material and a reduction of the diffusion distance in the bubbles or droplets. A need therefore exists for a fluid processing device that can provide a large surface area via the formation of smaller bubbles or droplets for mass transfer, and also provide convection mass transfer via mixing within bubbles or droplets through frequently separating and rejoining the bubbles or droplets.

DESCRIPTION OF EMBODIMENTS

Figure 4:
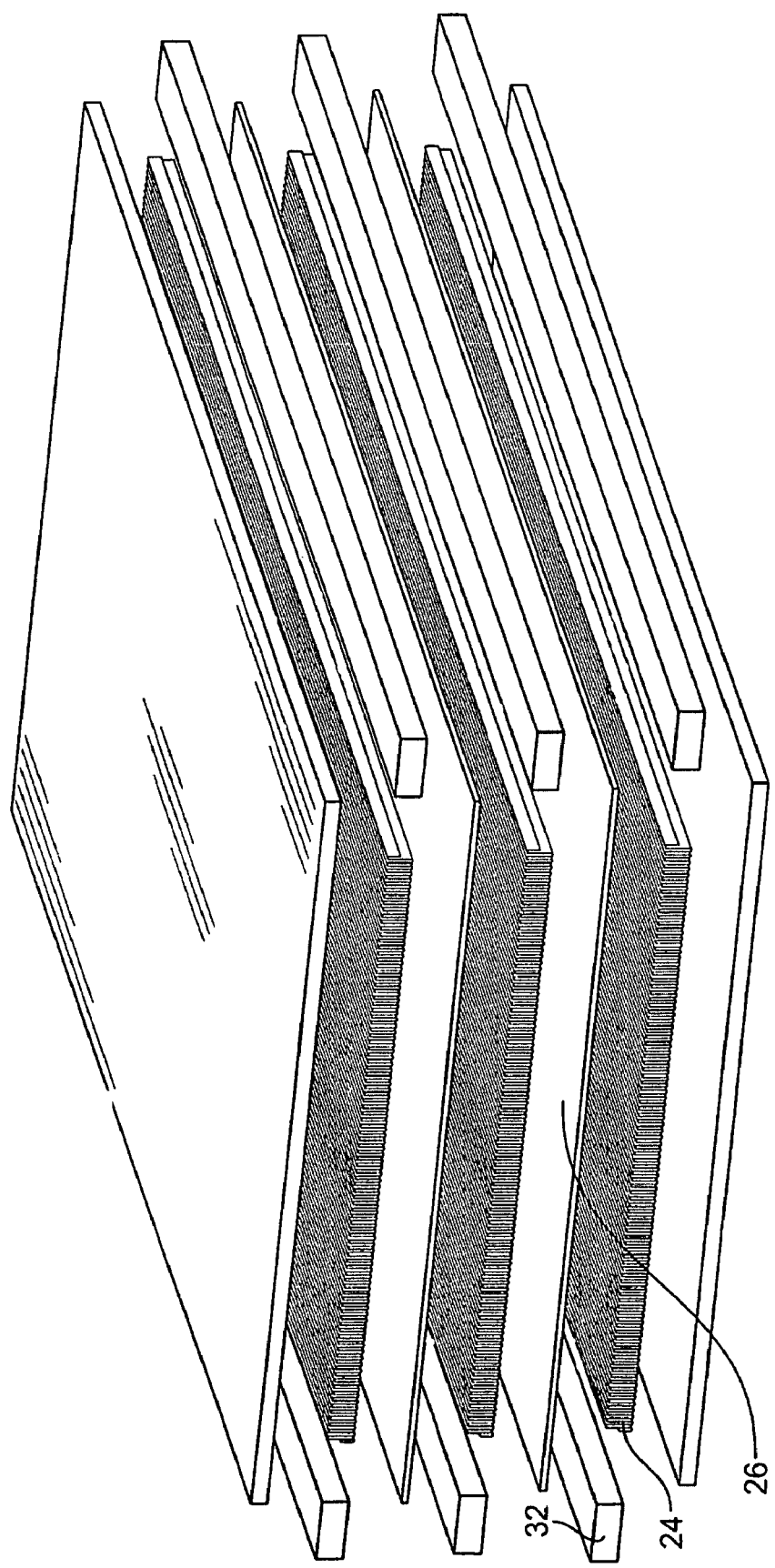
FIG. 4 is a perspective exploded view of the block portion of an embodiment of the plate fin fluid processing device of the present invention.
Figure 5:
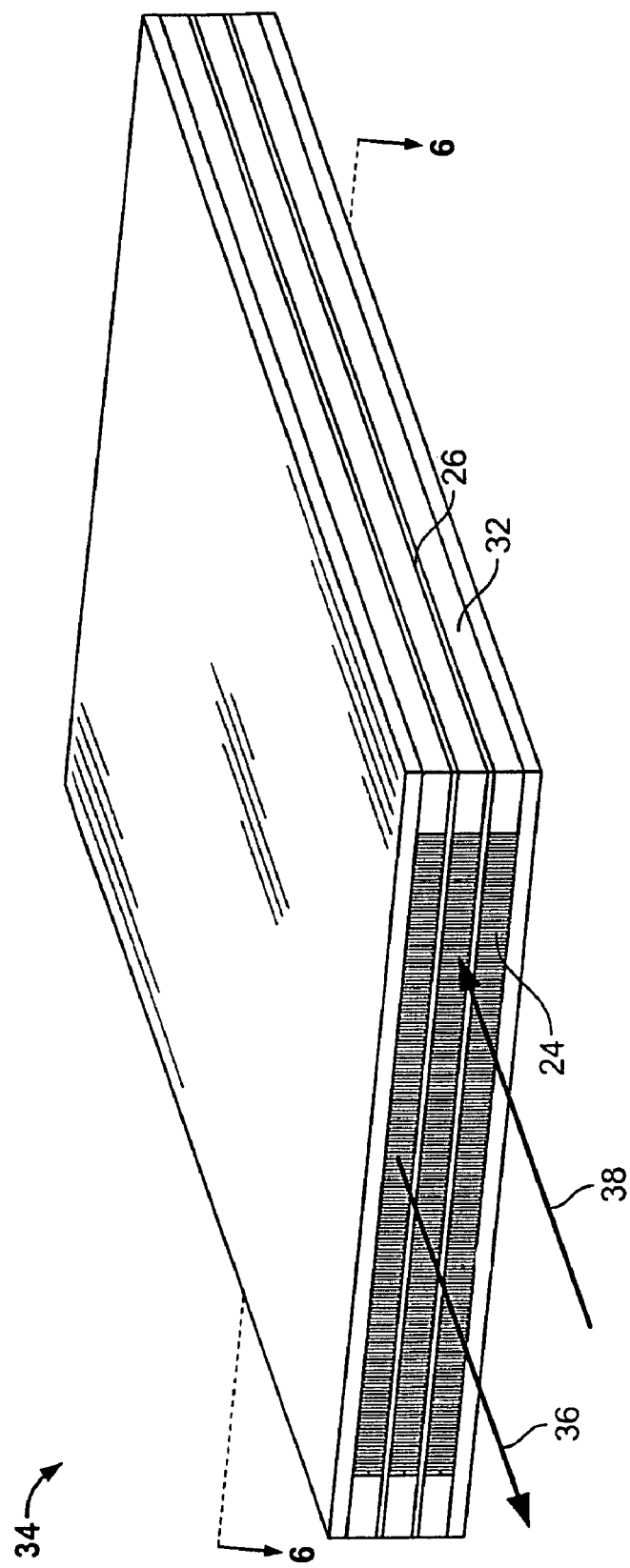
FIG. 5 is a perspective assembled view of the block portion of FIG. 4.
Figure 6:
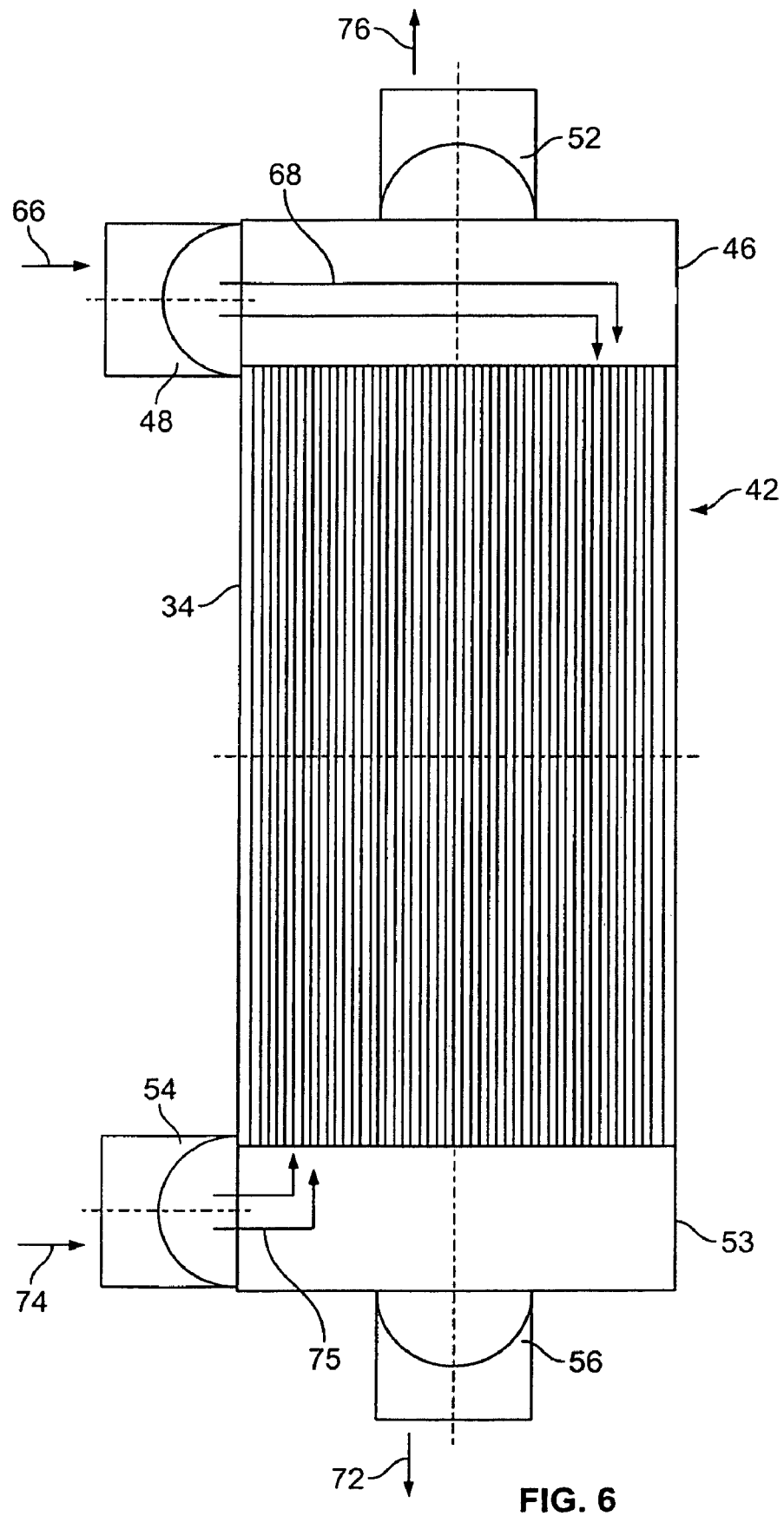
FIG. 6 is a cross-sectional view of the embodiment of the plate fin fluid processing device of the present invention including the block portion of FIGS. 4 and 5 taken along line 6-6 of FIG. 5.

FIGS. 4-6 illustrate the construction of an embodiment of the plate fin fluid processing device of the invention. While the device is described in terms of liquid-liquid extraction, it is to be understood that the invention may be used for other liquid-liquid processes and gas-liquid processes including, but not limited to, adsorption, absorption, desorption and reactions.

The plate fin device basically uses the technology of the FINTEC line of heat exchangers and reactors of Chart Energy & Chemicals, Inc. of The Woodlands, Tex. More specifically, as illustrated in FIG. 4, the device is constructed by stacking layers of corrugated fins, illustrated at 24, separated by parting sheets or plates 26 and sealed along the edges with side and end bars 32. All three components are preferably constructed from aluminum, but other metals may be used. The matrix assembly is preferably brazed in a vacuum furnace to form an integral, rigid block, illustrated in general at 34 in FIG. 5.

While three fin layers are illustrated in FIGS. 4 and 5, it is to be understood that the device may have more or less number of sets of fins (and corresponding plates). In addition, a variety of fin configurations and shapes and block constructions may be used as alternatives to the one shown in FIGS. 4 and 5. Such alternative fin configurations and shapes and block constructions also include those of the SHIMTEC line of heat exchangers and reactors of Chart Energy & Chemicals, Inc. of The Woodlands, Tex. These fin configurations and shapes and block constructions are illustrated in U.S. Pat. Nos. 6,510,894 and 6,736,201, both to Watton et al., the contents of which are hereby incorporated by reference. Alternatively, the fin configurations and shapes and block constructions of U.S. Pat. No. 5,193,611 to Hesselgreaves may be used, the contents of which are also hereby incorporated by reference.

As illustrated by arrows 36 and 38 in FIG. 5, fluids may flow in either direction through the fluid flow passages (the spaces between neighboring parting sheets or plates of block 34) containing the fins. In addition, the fluid flow passages of the device block 34 may be oriented so that fluid flows vertically, horizontally or at some other orientation when the plate fin device is fully assembled and placed in use.

As illustrated in FIG. 6, phase separation zones and nozzles are attached, preferably by welding, onto the block 34 to complete the plate fin device, which is indicated in general at 42. More specifically, the top of the device features an upper phase separation zone 46, top inlet nozzle 48 and top outlet nozzle 52. The upper phase separation zone 46 communicates with the fluid flow passages of the block portion 34, the top inlet nozzle 48 and the top outlet nozzle 52. The bottom of the column is provided with a bottom phase separation zone 53, bottom inlet nozzle 54 and bottom outlet nozzle 56, both of which communicate with the bottom phase separation zone 53, which in turn communicates with the fluid flow passages of block 34. It is to be understood that the phase separation zones and nozzle configurations illustrated are examples only and that a variety of alternative configurations may be substituted for the one shown.

Figure 7:
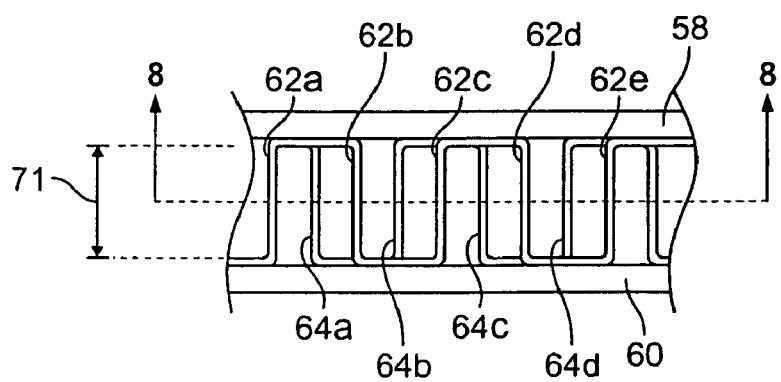
FIG. 7 is an end elevation view of a fluid flow passage of a block portion in an alternative embodiment of the plate fin fluid processing device of the present invention featuring a serrated fin configuration.
Figure 8:
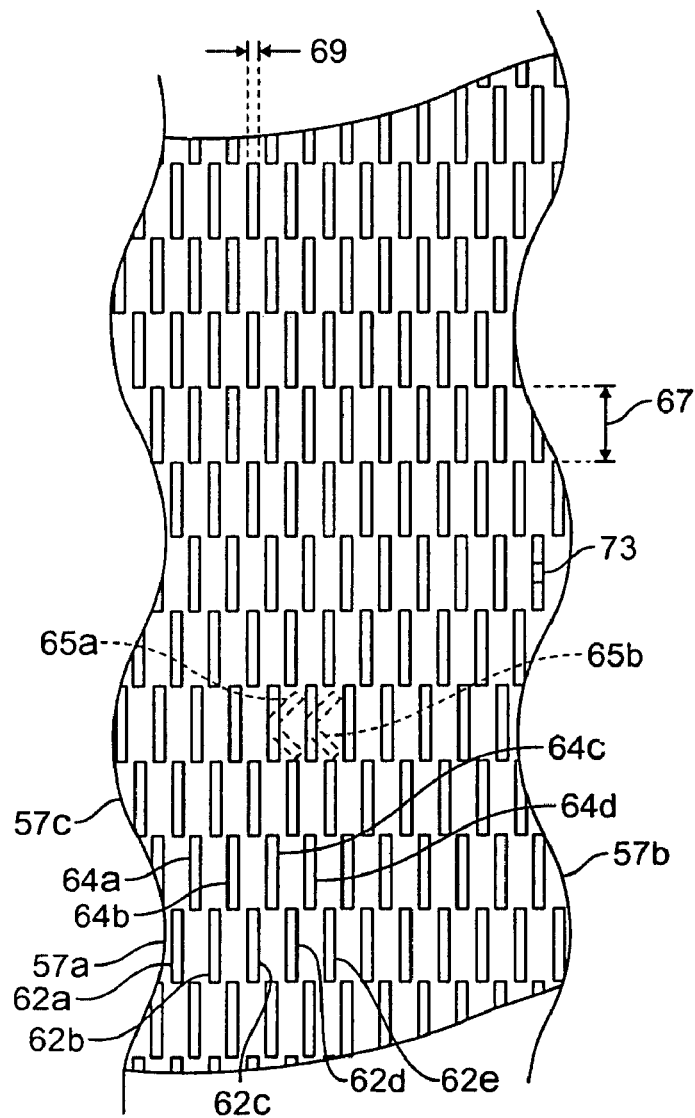
FIG. 8 is a cross-sectional view of the fluid flow passage of FIG. 7 taken along line 8-8 of FIG. 7.

An alternative and preferred embodiment of a fin layer and separating plates of the plate fin device is illustrated in FIGS. 7 and 8. In this embodiment, the fins of the device feature a serrated configuration. More specifically, as illustrated in FIG. 8, each fin layer includes alternating rows 57a, 57b, 57c, etc. of offset fins between parting sheets or plates, illustrated at 58 and 60 in FIG. 7. As illustrated in FIGS. 7 and 8, each row of fins may be a corrugated fin section with the rows formed together as a single fin layer. Alternatively, each corrugated fin section that forms a row may be formed individually and then joined to other rows to make up a single fin layer. The fins may be formed using a variety of other methods as long as they extend either fully, or partly, between the plates 58 and 60 of FIG. 7.

Multiple fin layers and separating plates with the configuration illustrated in FIGS. 7 and 8 are assembled into a block and preferably provided with the inlet and outlet nozzles and phase separation zones of FIG. 6. The remaining discussion assumes that is the case.

The operation of the embodiment of the fluid processing device illustrated in FIGS. 7 and 8 will now be described with respect to FIGS. 6-9 (with the understanding that the block 34 of FIG. 6 features the serrated fins of FIGS. 7-9).

Figure 9:
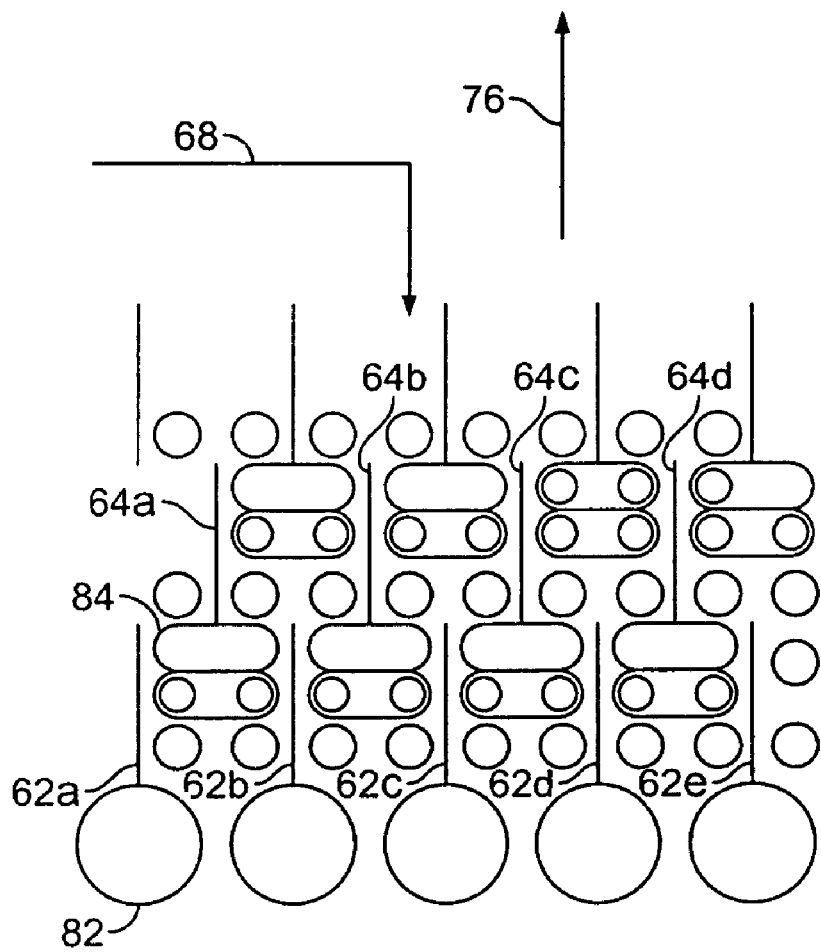
FIG. 9 is a schematic view of a portion of the fin passage of FIGS. 7 and 8 while in use.

As illustrated in FIGS. 7-9, a portion of one row (57a of FIG. 8) of the fin layer includes fins 62a-62e while a portion of the adjacent row (57b of FIG. 8) includes offset fins 64a-64d. Preferably, each fin structure is selected based on process requirements or the rate determining step (RDS) of the process. For example, for a serrated fin for aromatic compounds extraction after a reforming reaction, the fin length can be 1/16 inches to 5.0 inches, but is typically approximately 1/8 inches; and the fin thickness can be 0.004 inches to 0.024 inches, but is typically approximately 0.016 inches; and the fin spacing (measured horizontally, that is, along a row) between neighboring fins can be 0.03 inches to 0.50 inches, but is typically approximately 1/4 inches. The column length is dependent on the process requirement, and it can be several feet to one hundred feet (or even more).

As an alternative to the linear fin shape illustrated in FIGS. 7-9, the serrated fins may feature a herringbone shape, as illustrated in phantom at 65a and 65b in FIG. 8. The length of the fins (illustrated at 67 in FIG. 8), the thickness of the fins (illustrated at 69 in FIG. 8) and the height of the fins (illustrated at 71 in FIG. 7) may also be varied by row or zone in the device. As an example only, the length 67 (FIG. 8) of the fins could progressively increase in a selected direction of fluid flow in a fin layer. The fins could also be perforated (an opening formed through each), as indicated at 73 in FIG. 8. The number of fins in a row could also be varied throughout a fin layer.

With reference to FIGS. 6-9, a solvent flows through the inlet nozzle 48 at the top of the column or device, as illustrated by arrow 66, down through the fluid flow passages of the device, as illustrated by arrow 68, where fins such as 62a-62e and 64a-64d are encountered, and out the outlet nozzle 56 at the bottom of the device, as illustrated by arrow 72. A solution having the component to be removed flows into the device through the inlet nozzle 54 at the bottom of the device, as illustrated by arrow 74, up through the device, as illustrated by arrow 75, where fins such as 62a-62e and 64a-64d are encountered, and out the outlet nozzle 52 at the top of the device, as illustrated by arrow 76. The entry and exit points of the solution and solvent, however, may be reversed based on which is denser (with the heavier liquid flowing into the column through the inlet at the top of the device).

In the device, the fins provide highly effective mixing within the bubbles of solution, which greatly improves mass transfer in extraction processes. More specifically, as illustrated in FIG. 9, bubbles 82 are formed by the serrated fins 62a-62e. As further shown in FIG. 9, the bubbles are dispersed by the shearing forces from the edges of the fins. This process enhances the mixing inside of the bubbles. Furthermore, when the bubbles rejoin in the next chamber above the shearing area, a new, larger bubble 84 forms. During this rejoining process, the concentration of component A becomes more uniform again.

Figure 1:
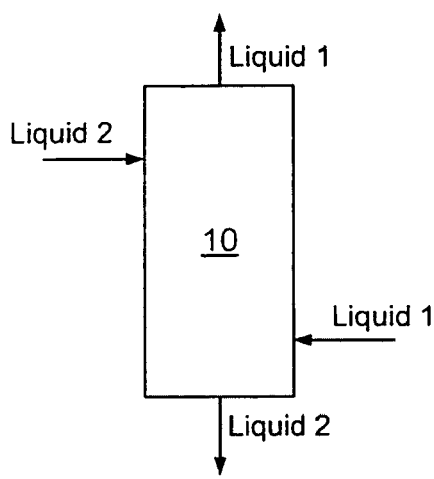
FIG. 1 is a schematic view of a conventional sieve tray extraction column.
Figure 2:
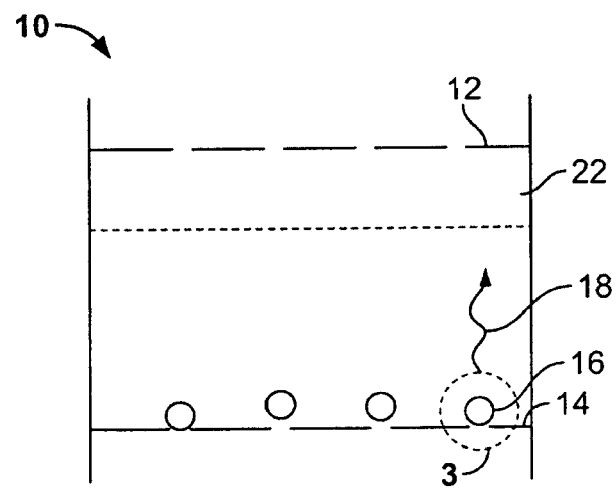
FIG. 2 is a schematic view of the interior of the conventional sieve tray extraction column of FIG. 1.
Figure 3:
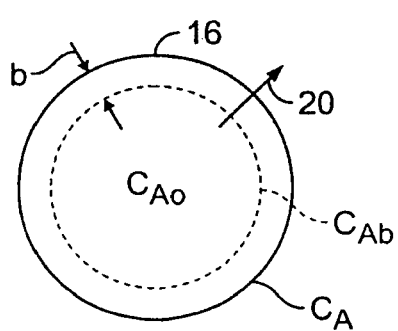
FIG. 3 is an enlarged view of a bubble from the sieve tray extraction column of FIGS. 1 and 2.
Figure 10:
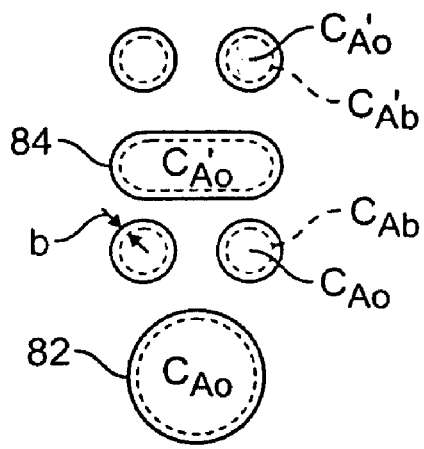
FIG. 10 is an enlarged view of bubbles from the fin passage portion of FIG. 9.

By the dispersing and rejoining process, as illustrated in FIG. 10 for bubbles 82 and 84, respectively, $C_{Ab}$ is close to $C_{A0}$ and $C_{Ab}'$ is close to $C_{A0}'$. The forced mixing within the bubbles, instead of the diffusion described with respect to FIGS. 2 and 3, results in enhanced mass transfer. Also, the resulting high concentration of component A at the inner edge of the boundary area ($C_{Ab}$ or $C_{Ab}'$) helps this component move through the bubble and go into solution in the solvent outside of the bubble. As a result, the mass transfer rate with the plate fin device of the invention is much higher than in a conventional device.

To apply the above example to specific processes, amine absorption is a commonly used carbon dioxide ($CO_2$) separation process. In such a gas-liquid process, an amine solution enters the inlet nozzle 48 at the top of the column, as illustrated by arrows 66 and 68 (FIG. 6). Flue and natural gas streams flow into the column through the inlet nozzle 54 at the bottom of the column, as illustrated by arrows 74 and 75. The gas streams bubble up through the amine solution and the $CO_2$ in the streams becomes bound to the amine groups in the solution. Consequently, the $CO_2$ content in the resulting gas stream exiting the outlet nozzle 52 at the top of the column at 76 is significantly reduced.

An example illustrating a gas-liquid reaction process involves the reaction of ethylene oxide (EO) with $CO_2$ to form ethylene carbonate (EC). EC is an intermediate substance used to form ethylene glycol (EG), which is largely used in the polymers industry. In such a process, EO solution enters the inlet nozzle 48 at the top of the column, as illustrated by arrows 66 and 68 (FIG. 6). A $CO_2$ gas stream flows into the column through the inlet nozzle 54 at the bottom of the column, as illustrated by arrows 74 and 75. The $CO_2$ bubbles up through the EO solution and the resulting liquid EC stream exits the outlet nozzle 56 at the bottom of the column, as illustrated by arrow 72.

Figure 11:
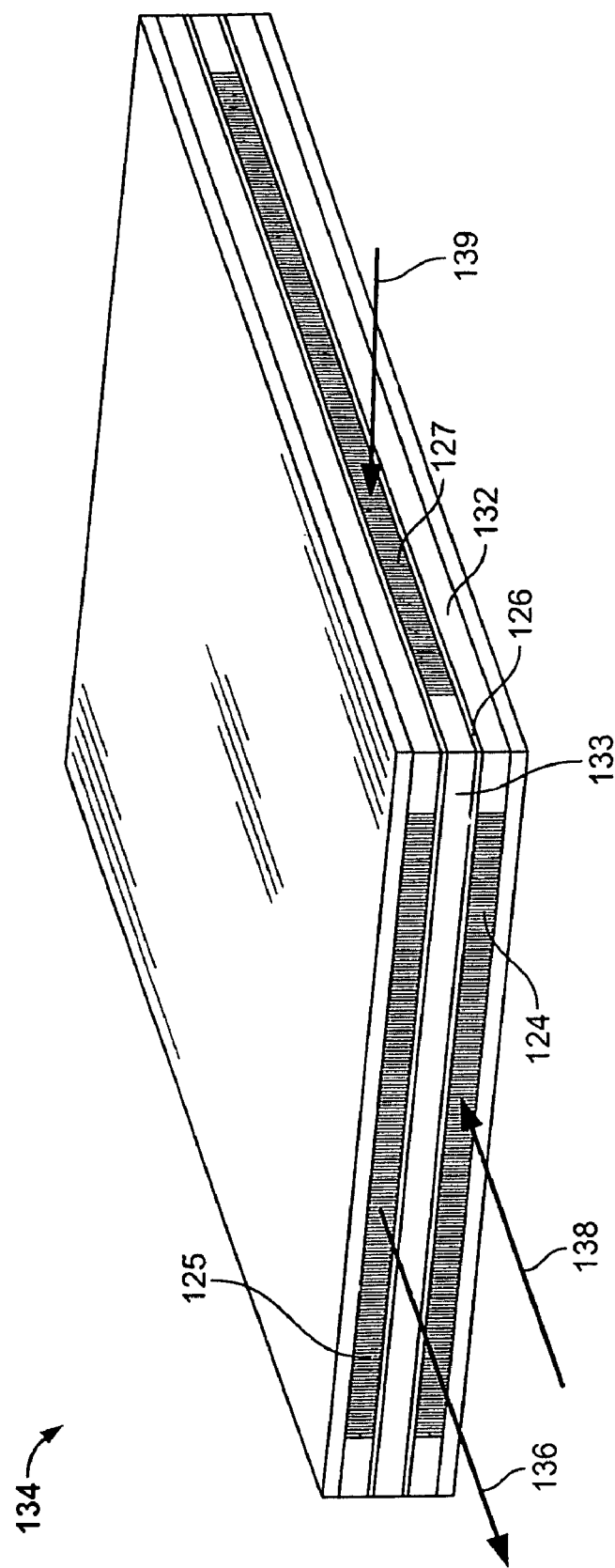
FIG. 11 is a perspective view of the block portion of an embodiment of the plate fin fluid processing device of the present invention including a cooling layer.

During the reaction of the above paragraph, a large amount of heat generated from the reaction can be removed by adding a cooling layer fluid passage adjacent to the reaction layer fluid passages in the column or device so that the reaction temperature can be controlled. An example of the block of a device including such an arrangement is indicated in general at 134 in FIG. 11. More specifically, as with the embodiments described above, the block is constructed by stacking layers of corrugated fins, illustrated at 124, 125 and 127, separated by parting sheets or plates 126 and sealed along the edges with side and end bars 132 and 133. As illustrated by arrows 136 and 138, fluids for performing a reaction or other process may flow in either direction through the fluid flow passages formed by fin layers 124 and 125. The fin layer 127 serves as a temperature control layer in that a temperature control fluid, in this case, a cooling fluid, may be directed through the resulting temperature control fluid flow passage, as indicated by arrow 139. As a result, heat may be removed from the passages formed by fin layers 124 and 125. As an alternative to a cooling fluid, a warming or heating fluid may be used as a temperature control fluid in the temperature control layer 127 to supply heat to the passages formed by fin layers 124 and 125.

Figure 12:
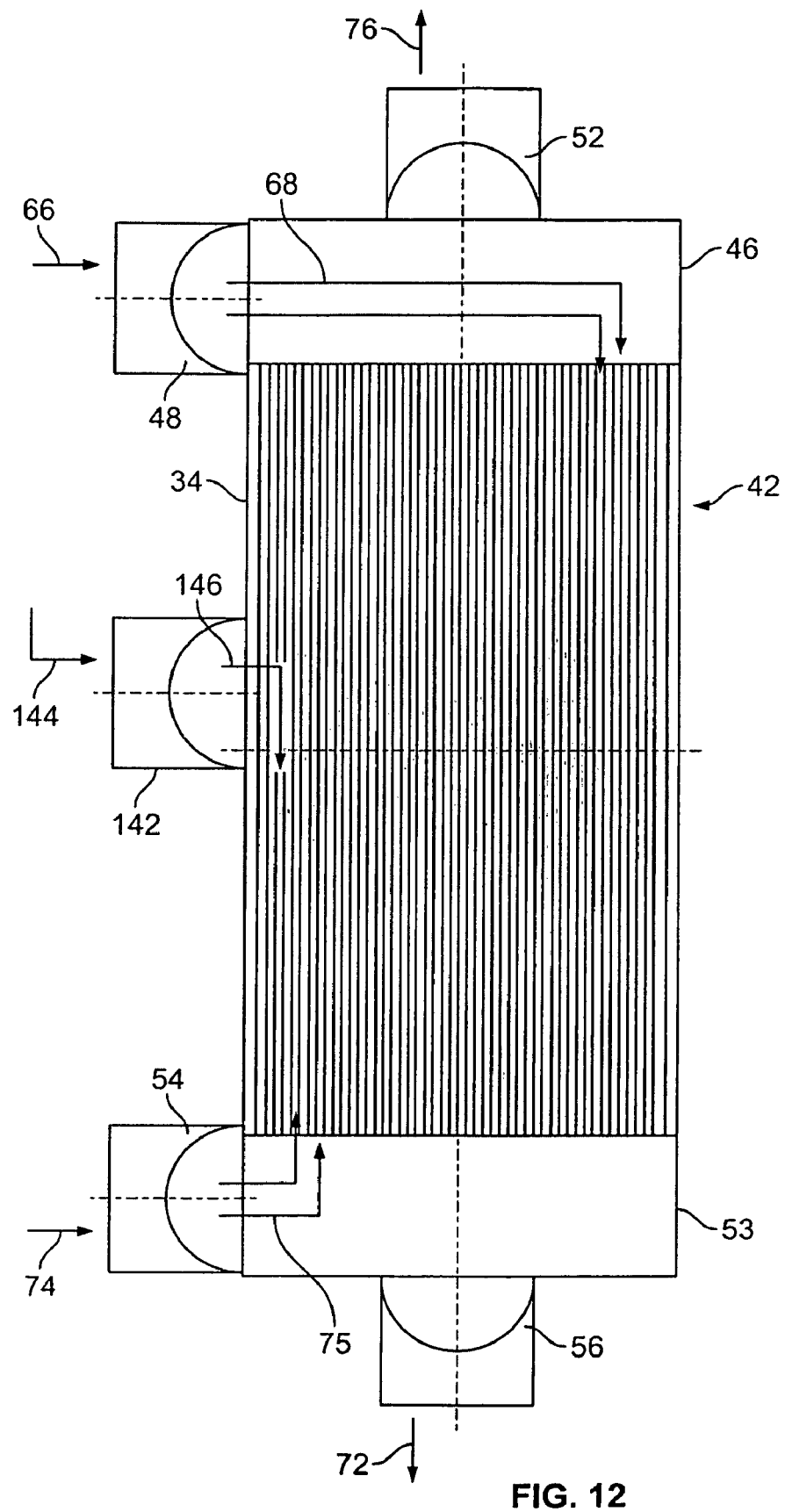
FIG. 12 is a cross-sectional view of the embodiment of the plate fin fluid processing device of FIG. 6 with the addition of a fluid injection port.

It should be noted that injections into the fluid passages may optionally be included in the device of the present invention based on reaction requirements. As an example, FIG. 12 shows the embodiment of FIG. 6 modified to include an injection port 142, which may include passages formed through the side or end bars and/or parting sheets of the device. As indicated by arrows 144 and 146, a fluid to be injected into the fluid flow passages enters the device through injection port 142 to enable or enhance the reaction within the fluid flow passages. Multiple injection ports such as 142 may be provided on the device to form a distribution system that enhances the quality of the injections, and thus the reaction.

As the above illustrates, the plate fin device not only provides a large surface area for mass transfer due to its unique structure, but also provide convection mass transfer within bubbles or droplets caused by the shearing force of the fin structure and frequent separating and rejoining. During this process, not only is the surface area refreshed, but also convection mass transfer is enhanced. Consequently, the efficiency for mass transfer is greatly improved. In addition, prompt heat removal occurs, which is particularly beneficial for the example of the above paragraph, which is highly exothermic.

Advantages of various embodiments of the plate fin device of the present invention include a low pressure drop across the device, equivalent process performance within a smaller device size and improved process efficiency due to shorter processing time and higher production per volume of device.

While embodiments of the invention have been shown and described, it will be apparent to those skilled in the art that changes and modifications may be made therein without departing from the spirit of the invention.

What is claimed is:

1. A device for processing fluids comprising:
   a) a plurality of fin layers;
   b) a plurality of unperforated plates separating the plurality of fin layers so that a fluid flow passage is defined through each fin layer;
   c) a first fluid inlet in fluid communication with a first phase separation zone in turn in fluid communication with a first end portion of the fluid flow passages and adapted to receive a first fluid stream;
   d) a first fluid outlet in fluid communication with a second opposite phase separation zone in turn in fluid communication with a second end portion of the fluid flow passages;

e) a second fluid inlet in fluid communication with the second opposite phase separation zone and adapted to receive a second fluid stream;

f) a second fluid outlet in fluid communication with the first phase separation zone; and g) said plurality of fin layers each comprising a plurality of alternating rows of offset fins, and providing a shearing action on the second fluid stream as it flows through the fluid flow passages to provide mass transfer to the first fluid stream as it flows through the fluid flow passages.

2. The device of claim 1 wherein the processing includes mixing.

3. The device of claim 1 wherein the processing includes reacting.

4. The device of claim 1 further comprising a plurality of side bar pairs, each side bar pair positioned adjacent to opposing side edges of each fin layer, each of said side bar pairs also positioned between a pair of bordering plates for each fin layer so that the side edges of each fin layer are enclosed.

5. The device of claim 4 wherein the plurality of fin layers, plurality of plates and plurality of end bars are secured together by a metal joining process so as to form a block.

6. The device of claim 5 wherein the metal joining process is brazing.

7. The device of claim 5 where in the metal joining process is diffusion bonding.

8. The device of claim 4 wherein the plurality of fin layers, plurality of plates and plurality of end bars are all constructed from metal.

9. The device of claim 8 wherein the metal is aluminum.

10. The device of claim 1 wherein each fin is approximately 1/16 to 5 inches long and 0.004 to 0.024 inches thick.

11. The device of claim 1 wherein the fin spacing along a row is approximately 0.03 to 0.5 inches.

12. The device of claim 1 where each row includes a corrugated fin section.

13. The device of claim 1 wherein at least one of the fins feature a herringbone shape.

14. The device of claim 1 wherein at least one of the fins are perforated.

15. The device of claim 1 wherein at least two of the alternating rows of fins feature differing fin thicknesses.

16. The device of claim 1 wherein at least two of the alternating rows of fins feature differing fin lengths.

17. The device of claim 1 wherein at least two of the alternating rows of fins feature differing fin heights.

18. The device of claim 1 wherein at least two of the alternating rows of fins feature differing fin spacing along a row.

19. The device of claim 1 wherein at least one of the fin layers features corrugated fins.

20. The device of claim 1 wherein the first fluid inlet and second fluid inlet each includes an inlet nozzle.

21. The device of claim 20 wherein the first fluid outlet and the second fluid outlet each includes an outlet nozzle.

22. The device of claim 1 wherein the first fluid stream includes a liquid.

23. The device of claim 22 wherein the second fluid stream includes a liquid.

24. The device of claim 22 wherein the second fluid stream includes a gas.

25. The device of claim 1 further comprising an injection port in communication with the fluid flow passages, said injection port adapted to receive a third injection fluid stream.

26. The device of claim 1 further comprising a temperature control layer adapted to receive a temperature control fluid and positioned adjacent to at least one of said plurality of plates.

27. A fluid processing device comprising:

a) an unperforated first plate;

b) an unperforated second plate;

c) a fin layer positioned between the first and second plates so that a fluid flow passage is defined through the fin layer;

d) a first fluid inlet in fluid communication with a first phase separation zone in turn in fluid communication with a first end portion of the fluid flow passage and adapted to receive a first fluid stream;

e) a first fluid outlet in fluid communication with a second opposite phase separation zone in turn in fluid communication with a second end portion of the fluid flow passage;

f) a second fluid inlet in fluid communication with the second opposite phase separation zone and adapted to receive a second fluid stream;

g) a second fluid outlet in fluid communication with the first phase separation zone; and h) said fin layer comprising a plurality of alternating rows of offset fins, and providing a shearing action on the second fluid stream as it flows through the fluid flow passage to provide mass transfer to the first fluid stream as it flows through the fluid flow passage.

28. The device of claim 27 wherein the processing includes mixing.

29. The device of claim 27 wherein the processing includes reacting.

30. The fluid processing device of claim 27 further comprising a pair of side bars, each side bar positioned adjacent to opposing side edges of the fin layer, said pair of side bars also positioned between the first and second plates so that the side edges of the fin layer are enclosed.

31. The fluid processing device of claim 30 wherein the fin layer, first and second plates and pair of end bars are secured together by a metal joining process so as to form a block.

32. The fluid processing device of claim 31 wherein the metal joining process is brazing.

33. The fluid processing device of claim 31 wherein the metal joining process is diffusion bonding.

34. The fluid processing device of claim 30 wherein the fin layer, first and second plates and pair of end bars are all constructed from metal.

35. The fluid processing device of claim 34 wherein the metal is aluminum.

36. The fluid processing device of claim 27 wherein each fin is approximately 1/16 inches to 5 inches long and 0.004 to 0.024 inches thick.

37. The fluid processing device of claim 27 wherein the fin spacing along a row is approximately 0.03 to 0.5 inches.

38. The fluid processing device of claim 27 wherein each row includes a corrugated fin section.

39. The fluid processing device of claim 27 wherein at least one of the fins feature a herringbone shape.

40. The fluid processing device of claim 27 wherein at least one of the fins are perforated.

41. The fluid processing device of claim 27 wherein at least two of the alternating rows of fins feature differing fin thicknesses.

42. The fluid processing device of claim 27 wherein at least two of the alternating rows of fins feature differing fin lengths.

43. The fluid processing device of claim 27 wherein at least two of the alternating rows of fins feature differing fin heights.

44. The fluid processing device of claim 27 wherein the fin layer features corrugated fins.

45. The fluid processing device of claim 27 wherein the first fluid inlet and second fluid inlet each includes an inlet nozzle.

46. The fluid processing device of claim 45 wherein the first fluid outlet and the second fluid outlet each includes an outlet nozzle.

47. The device of claim 27 wherein the first fluid stream includes a liquid.

48. The device of claim 47 wherein the second fluid stream in includes a liquid.

49. The device of claim 47 wherein the second fluid stream includes a gas.

50. The fluid processing device of claim 27 further comprising an injection port in communication with the fluid flow passage, said injection port adapted to receive a third injection fluid stream.

51. The fluid processing device of claim 27 further comprising:
  i) an unperforated third plate;
  j) a temperature control layer positioned between the third and second plates so that a temperature control fluid flow passage is defined through the temperature control layer, said temperature control fluid flow passage adapted to receive a temperature control fluid.

* * * * *